Oct. 4, 1949.  G. W. HOLMES  2,483,772
GRASS CUTTER AND HEDGE TRIMMER
Filed June 18, 1945  5 Sheets-Sheet 1
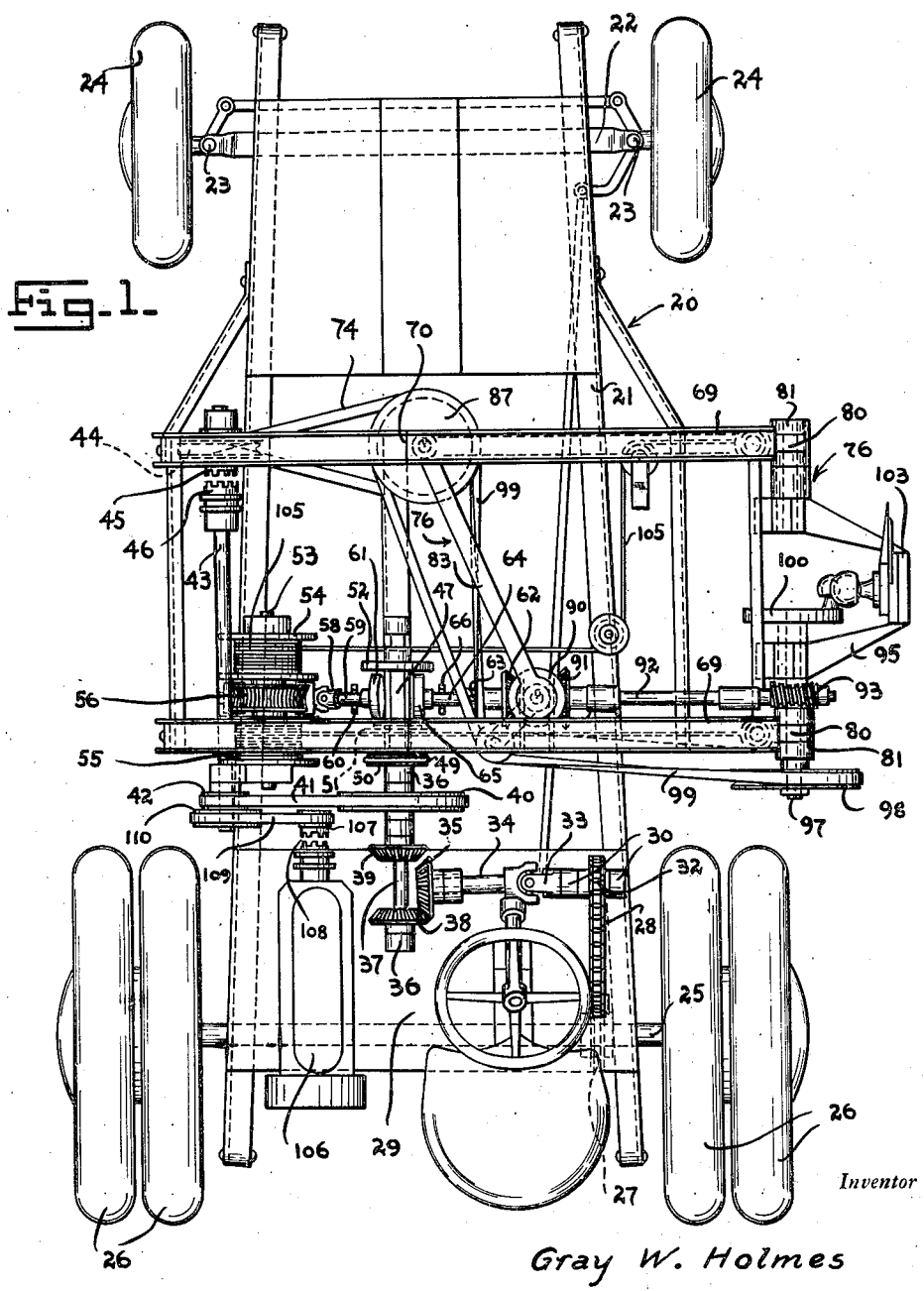
Inventor
Gray W. Holmes
By Clarence A. O'Brien
and Harvey B. Jacobson
Attorneys

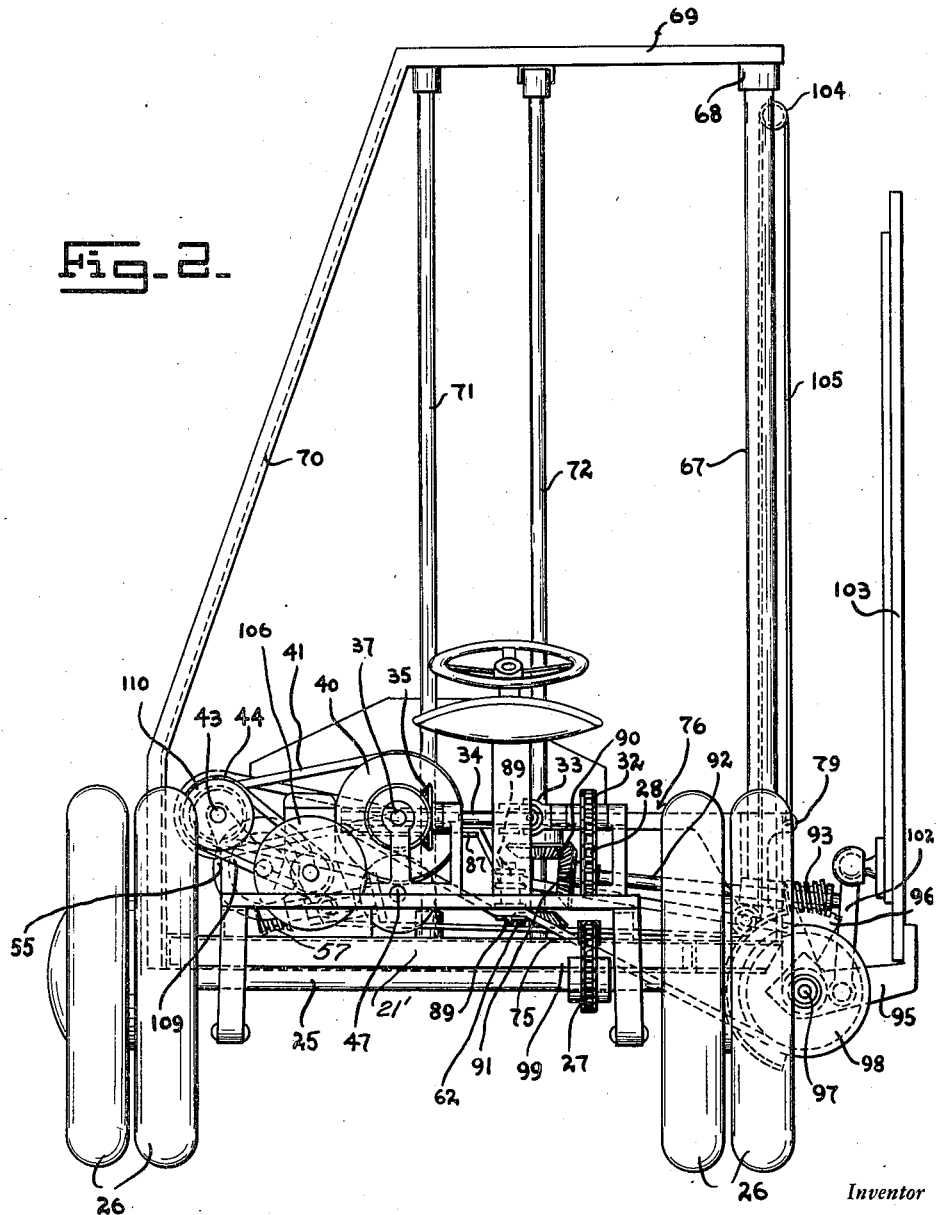

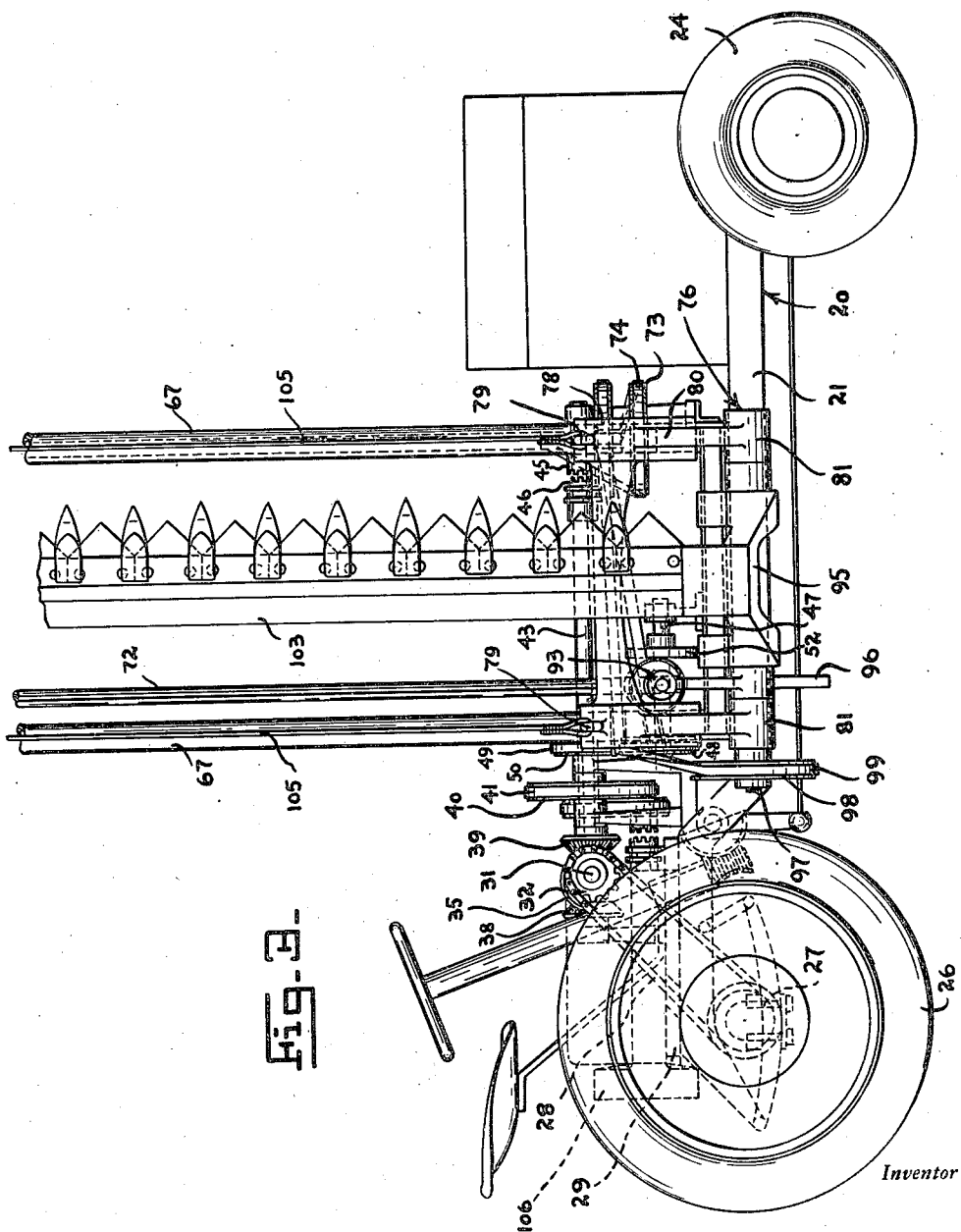

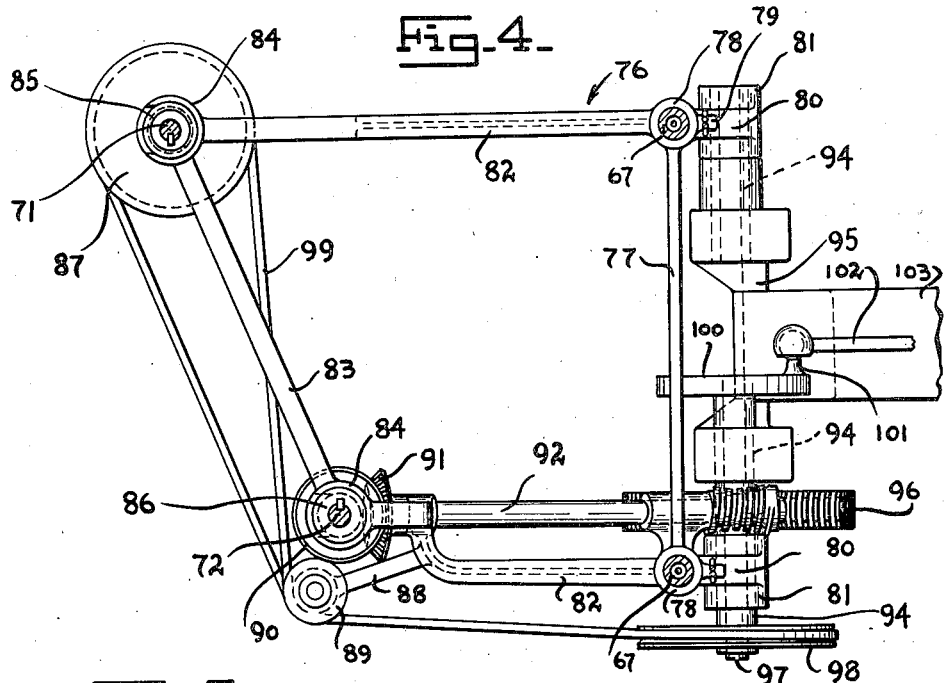
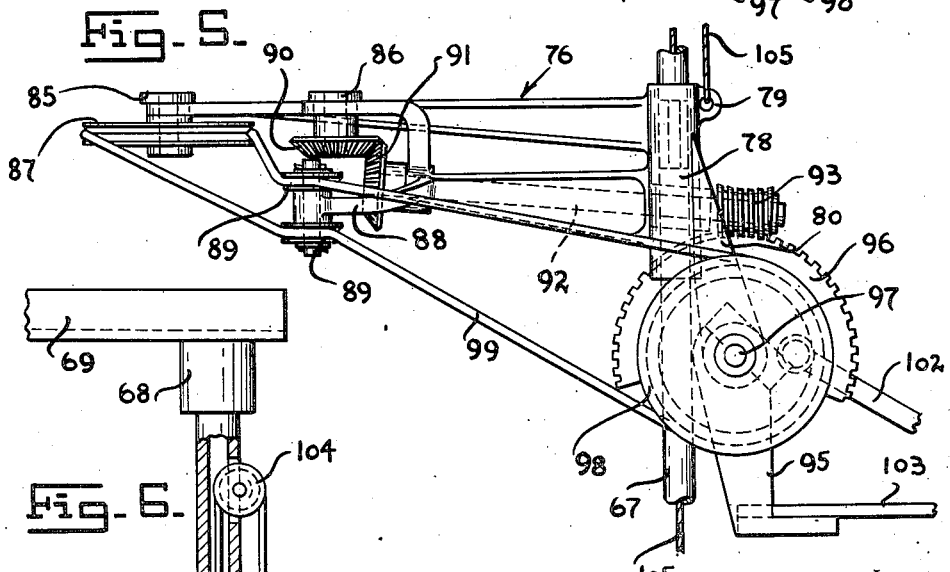

Oct. 4, 1949.　　　　　G. W. HOLMES　　　　　2,483,772
GRASS CUTTER AND HEDGE TRIMMER
Filed June 18, 1945　　　　　　　　　　　5 Sheets-Sheet 5
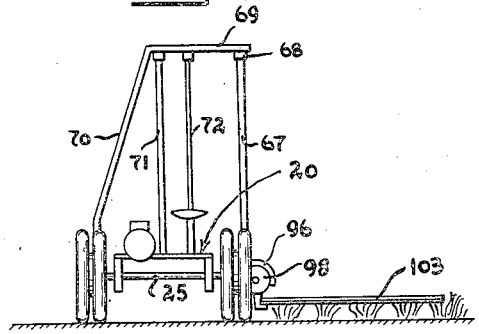
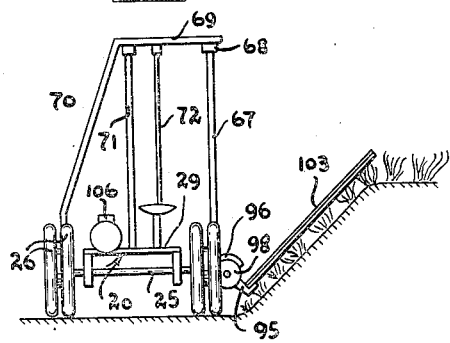
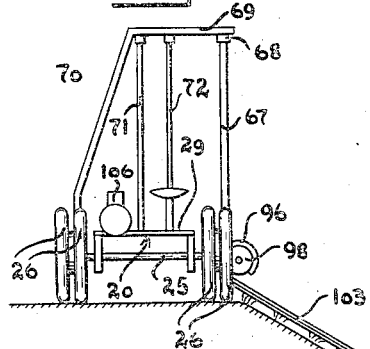
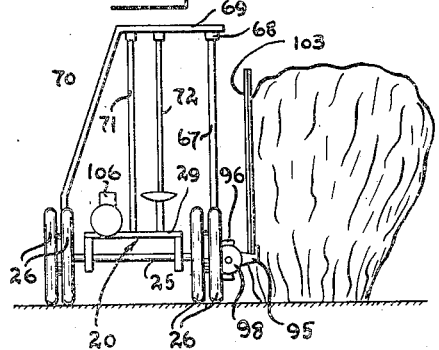
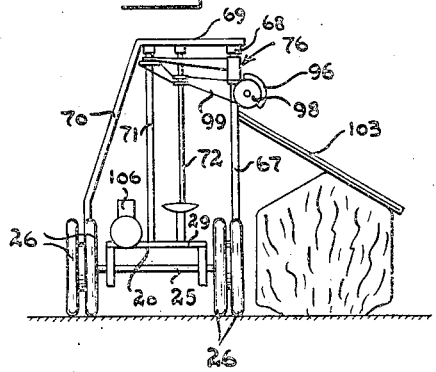
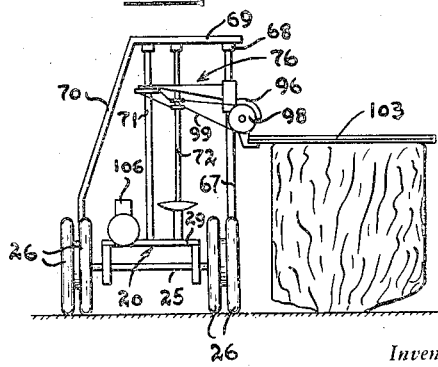
Inventor
Gray W. Holmes
By Clarence A. O'Brien
and Harvey B. Jacobson
Attorneys Patented Oct. 4, 1949

2,483,772

UNITED STATES PATENT OFFICE 2,483,772

GRASS CUTTER AND HEDGE TRIMMER

Gray W. Holmes, Miller, Mo.

Application June 18, 1945, Serial No. 600,190

19 Claims. (Cl. 56—25)

This invention relates to a grass cutter and hedge trimmer and has for its object to easily and quickly cut weeds and grass not only on the level but in ditches and on terraces and slopes.

Another object is to trim hedge bushes to various shapes according to the desire of the operator.

Among its features my invention embodies a sickle mounted to swing about a horizontal axis so that it may assume various angular positions ranging from below the horizontal to the vertical so that the device may be employed to perform the various operations above referred to.

Other features embody a vertically movable carriage upon which the sickle is mounted and means to actuate the sickle irrespective of its angular or vertical position.

Still other features embody means adapted to be driven by the advance of the sickle and its support for actuating the sickle, elevating it and moving it to its various angular positions.

Further features involve a wheeled vehicle upon which the sickle is mounted to move vertically and swing in an arc which lies perpendicular to the axis of the vehicle, and auxiliary power means for driving the sickle actuating, sickle elevating and sickle swinging elements.

In the drawings:

Figure 1 is a plan view of a combination grass cutter and hedge trimmer constructed in accordance with my invention.

Figure 2 is a rear end view of Figure 1.

Figure 3 is a side view of Figure 1.

Figure 4 is an enlarged plan view of the sickle supporting carriage.

Figure 5 is a side view of Figure 4.

Figure 6 is a fragmentary view on an enlarged scale and partly in section of one of the carriage supporting columns.

Figure 7 is a diagrammatic rear view of the machine showing the sickle in grass cutting position.

Figure 8 is a view similar to Figure 7 showing the sickle in position to cut the grass of a terrace.

Figure 9 is a view similar to Figure 7 showing the sickle swing into a position to cut the grass and weeds of a ditch.

Figure 10 is a view similar to Figure 7 showing the sickle in a vertical hedge trimming position.

Figure 11 is a similar view showing the sickle in another position for hedge trimming, and Figure 12 is a similar view showing the sickle in a position to trim the top of a hedge so that it is horizontal.

Referring to the drawings in detail my invention includes a wheeled vehicle designated generally 20 which comprises a chassis 21 supported at its forward end on an axle 22 carrying at opposite ends steering knuckles 23 on which wheels 24 are mounted. Mounted in suitable bearings near the rear end of the chassis 21 is an axle 25 to opposite ends of which wheels 26 are fixed so as to cause the axle to turn as the vehicle is advanced, it being understood that the vehicle is primarily of the trailer type though it may be equipped with a power unit for self propulsion if so desired. Attached to the axle 25 intermediate its ends is a sprocket 27 over which a main drive chain 28 is trained.

Extending transversely adjacent the rear end of the chassis is a platform 29 which not only serves as a floor board for the machine but also acts as a support for bearing supporting brackets 30 in which a transversely extending stub shaft 31 is mounted to rotate. This shaft carries at one end a drive sprocket 32 over which the chain 28 runs so that as the vehicle is advanced the shaft 31 will be driven.

Carried by the end of the shaft 31 opposite the sprocket 32 is a universal joint 33 which has driving connection with a horizontally movable shaft 34 carrying at its free end a bevel gear 35.

Mounted to rotate in suitable brackets 36 and extending longitudinally of the chassis is a shaft 37 carrying near one end a bevel gear 38 which when the shaft 34 is in the position shown in Figure 1 meshes with the bevel drive gear 35 for rotating the shaft in one direction. A similar gear 39 is mounted on the shaft 37 in spaced relation to the gear 38 but in such position that when the shaft 35 is moved forwardly the gear 35 will have meshing engagement therewith. It is to be understood of course that the spacing between the two gears 38 and 39 is such that the gear 35 may turn freely between them so as to provide a neutral position where no driving force is imparted to the shaft 37.

Mounted on and driven by the shaft 37 forwardly of the gear 39 is a drive pulley 40 over which a belt 41 having driving connection with a pulley 42 is trained. The pulley 42 is carried near the rear end of a longitudinally extending drive shaft 43 mounted near one side of the vehicle which carries at its extreme forward end a loose pulley 44 carrying a clutch half 45. Splined to move longitudinally on the shaft 43 near its forward end is a conventional clutch half 46 which is adapted to be advanced in any suitable manner into engagement with the clutch half 45 to establish driving connection between the shaft 43 and pulley 44.

Extending forwardly from the forward end of the shaft 37 but on an axis below it is a shaft 47 carrying at its rear end a pulley 48 over which a belt 49 is trained. This belt has driving connection with a pulley 50 carried by the extreme forward end of the shaft 37. Mounted on the shaft 47 intermediate its ends is a friction disk 51 and secured to the shaft 47 in spaced relation to the disk 51 is a friction disk 52.

Rotatably mounted in parallel relation to the shaft 47 near the shaft 43 is a shaft 53 to which are attached winding drums 54 and 55. A worm gear 56 is also attached to the shaft 53 and has meshing engagement with a worm 57 which extends transversely beneath the worm gear and carries at one end a universal joint 58 to which a movable shaft 59 is connected. The end of this shaft remote from the universal joint is shiftable forwardly and rearwardly by means of a fork 60 and carries a friction disk 61 which is adapted to engage one or the other of the disks 51 or 52, it being understood of course that said disk 61 is of such a diameter that it can be moved to a neutral position where it will engage neither.

Mounted for rotation in substantial alignment with the shaft 59 is a shaft carrying at one end a bevel pinion 62 and carried at the end of aforesaid shaft opposite the pinion 62 is a universal joint 63 to which a shaft 64 is connected. This shaft 64 carries at its free end a friction disk 65 which is adapted to be moved forwardly or rearwardly to contact one or the other friction disk 51 or 52 by means of a fork 66. While the disk 65 is adapted to be driven by contact with either the disk 51 or 52 it is to be understood that it too is of such diameter that it may be moved into a neutral position and out of contact with either.

Extending transversely of the chassis 21 intermediate its ends is a pair of spaced cross beams 21' to the outer ends of which, to one side of the chassis, are fixed a pair of spaced parallel columns 67. Each such column is tubular in form and carries at its upper end a socket 68 which is welded or otherwise secured to a transversely extending brace 69. These braces 69 extend horizontally to a point somewhat beyond the plane of the longitudinal axis of the chassis and then bend downwardly and outwardly as at 70 and their lower ends are attached to the ends of the cross beams opposite those carrying the columns 67. It will thus be seen that a rigid super structure is provided on the chassis upon which may be mounted the sickle and its operating mechanism, to be more fully hereinafter described.

Rotatably mounted in vertical aligned bearings carried by the foremost cross beam and brace 69 is a splined shaft 71 and mounted in vertically aligned bearings carried by the rearmost cross beam and brace 69 is a splined shaft 72. Secured to the shaft 71 near its lower end is a drive pulley 73 over which is trained a drive belt 74 having driving connection with the pulley 44. It will thus be seen that when the clutch half 46 is meshed with the clutch half 45 driving connection between the shaft 43 and the shaft 71 will be established.

Keyed or otherwise secured near the lower end of the splined shaft 72 is a bevel gear 75 having meshing engagement with the gear 62 and it will thus be seen that when the friction disk 65 is moved into engagement with the disk 51 the shaft 72 will be rotated in one direction and when the disk 65 is moved into engagement with the disk 52 the shaft 72 will be rotated in a reverse direction.

Mounted for vertical sliding movement on the columns 67 is a carriage designated generally 76. This carriage best illustrated in Figures 4 and 5 comprises a cross bar 77 carrying at each of its ends a sleeve 78. Each sleeve 78 is provided at its upper end with an eye 79 for a purpoe to be more fully hereinafter described. Carried by each sleeve 78 is a depending bracket arm 80 terminating at its lower end in a bearing 81. These bearings are provided with aligning openings the purpose of which will hereinafter appear. Extending inwardly from the sleeves 78 are parallel bracket arms 82 the inner ends of which are joined by a tie bar 83 and are provided with forks 84 carrying bushings 85 and 86 through which the splined shafts 71 and 72 extend thus to provide for vertical movement of the bushings but to prevent relative rotation of the shafts and bushings. Carried at the lower end of the bushing 85 is a pulley 87 and supported on the opposite arm 82 is a bracket 88 carrying idler pulleys 89 the purpose of which will be hereinafter explained. The shaft 72 serves as the sickle control shaft to regulate the height of the carriage 76 and the attached mechanism, including the sickle.

Carried at the lower end of the bushing 86 is a bevel pinion 90 which meshes with a bevel pinion 91 having driving connection with a shaft 92 which rotates about an axis parallel with the longitudinal axes of the arms 82. This shaft carries at its end opposite the pinion 91 a worm 93 the use of which will hereinafter appear.

Mounted for rotation in each bearing 81 is a tubular shaft 94 to the inner end of each of which is fixed a yoke 95 and fixed to one of the shafts 94 in alignment with the shaft 92 is a segmental worm gear 96 which has meshing engagement with the worm 93. Mounted for rotation within the tubular shaft 94 carrying the worm gear 96 is a drive shaft 97 to the outer end of which is fixed a pulley 98. A drive belt 99 is trained over the pulley 87 and around the idler pulleys 89 and has driving connection with the pulley 98 so that when the shaft 71 is rotated the shaft 97 will be driven. Mounted on the inner end of the shaft 97 between the arms of the yoke 95 is a disk 100 carrying a crank arm 101 to which a connecting rod 102 has universal connection.

Carried between the arms of the yoke 95 adjacent their outer ends i. e. those ends opposite the tubular shaft 94 is a sickle 103 carrying a sickle bar to which the end of the connecting rod 102 opposite that which is connected to the crank arm 101 is attached. It will thus be seen that when the shaft 97 is rotated, reciprocatory motion will be transmitted to the sickle bar.

Mounted adjacent the upper end of each column 67 is a sheave 104 over which a cable 105 is trained. One end of each cable is attached to an eye 79 carried by the carriage 76, while the opposite end passes downwardly through the interior of its respective column to the bottom thereof where it is guided outwardly over a suitable sheave and where necessary over conventional guide pulleys to the drums 54 and 55, it being understood that a separate winding drum is provided for each cable.

As a piece of optional equipment I may if desired provide an auxiliary power device such as an internal combustion engine 106 which is designed to have driving connection with a pulley 107 through the medium of a clutch 108. A drive belt 109 is trained over the pulley 107 and has driving connection with a pulley 110 having driving connection with the shaft 43.

In operation it will be seen that when the vehicle 20 moves forwardly as in the case of trailing a tractor the rotary motion imparted to the axle 25 by the wheels 26 will be transmitted to the shaft 34 through the medium of the sprocket 27, chain 28, sprocket 32 and universal joint 33. Assuming that the gear 35 is in mesh with the gear 38 it will be seen that the shaft 37 will be rotated in a counter clockwise direction. Should the gear 35 be in mesh with the gear 39 the shaft 37 of course will be driven in a reverse direction. Rotation of the shaft 37 drives both pulleys 40 and 50 thus imparting rotary motion to the shafts 43 and 47 through the medium of belt 41 and pulley 42 and belt 49 which has driving connection with a pulley on the shaft 47. Upon engaging the clutch half 46 with the clutch half 45 the vertical shaft 71 will be rotated through the medium of pulley 44 belt 74 and pulley 73. By reason of the rotation of the shaft 71 the pulley 87 will be driven so as to impart rotary motion to the disk 100 through the shaft 97, pulley 98 and belt 99. It will thus be seen that the sickle bar will be reciprocated upon the sickle 103.

When it is desired to alter the angular relation of the sickle about its horizontal axis the disk 65 is moved into peripheral engagement with one of the disks 51 or 52. Since these disks are mounted on the continuously driven shaft 47 it will be obvious that the disk 65 will be rotated thus imparting rotary motion to the vertical sickle control shaft 72 which through its splined connection with gear 90 imparts rotary motion to the worm 93 through gear 91 and shaft 92. Inasmuch as the worm 93 is in constant mesh with the segmental worm gear 96 which in turn is fixed to the tubular shaft 94 to which one side of the yoke 95 is secured it will be obvious that as the worm gear 96 is rotated the yoke will swing about its horizontal axis and move the sickle 103 to the desired angular position.

In order to move the carriage 76 into various positions vertically on the columns 67 the friction disk 61 is shifted into peripheral engagement with one or the other of the continuously driven friction disks 51 or 52 and it will thus be seen that the drums 54 and 55 will be rotated to wind-up or pay out the cables 105 wound thereon. Such movement of the cables by the drums causes the ends of the cables which are attached to the eyes 79 on the sleeves 78 to raise or lower the carriage 76 according to the direction in which the drums rotate.

While in the foregoing there has been shown and described the preferred embodiment of this invention it is to be understood that minor changes in the details of construction, combination and arrangement of parts may be resorted to without departing from the spirit and scope of the invention as claimed.

What is claimed is:

1. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, and means on the carriage coupled with the vertically disposed drive shaft for actuating the sickle.

2. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, a drive pulley carried by the carriage and adapted to be driven by the drive shaft, and means establishing driving connection between the pulley and the sickle.

3. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, means on the carriage coupled with the vertically disposed drive shaft for actuating the sickle, and means on the vehicle to move the carriage vertically on the columns and to hold said carriage in the position to which it is moved.

4. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, a drive pulley carried by the carriage and adapted to be driven by the drive shaft, means establishing driving connection between the pulley and the sickle, and means on the vehicle to move the carriage vertically on the columns and to hold the carriage in the position to which it is moved.

5. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, means on the carriage coupled with the vertically disposed drive shaft for actuating the sickle, and a worm drive on the vehicle to move the carriage vertically on the columns and to hold the carriage in the position to which it is moved.

6. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, a drive pulley carried by the carriage and adapted to be driven by the drive shaft, means establishing driving connection between the pulley and the sickle, and a worm drive on the vehicle to move the carriage vertically on the columns and to hold the carriage in the position to which it is moved.

7. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, means on the carriage to swing the sickle in the vertically disposed arc and to hold it in adjusted position about the horizontal axis and means establishing driving connection between the sickle control shaft and the sickle swinging means.

8. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, a drive pulley carried by the carriage and adapted to be driven by the drive shaft, means establishing driving connection between the pulley and the sickle, means on the carriage to swing the sickle in the vertically disposed arc and to hold it in adjusted position about the horizontal axis and means establishing driving connection between the sickle control shaft and the sickle swinging means.

9. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, means on the carriage to swing the sickle in the vertically disposed arc and to hold it in adjusted position about the horizontal axis, means establishing driving connection between the sickle control shaft and the sickle swinging means, and means on the vehicle to move the carriage vertically on the columns and to hold said carriage in the position to which it is moved.

10. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, a drive pulley carried by the carriage and adapted to be driven by the drive shaft, means establishing driving connection between the pulley and the sickle, means on the carriage to swing the sickle in the vertically disposed arc and to hold it in adjusted position about the horizontal axis, means establishing driving connection between the sickle control shaft and the sickle swinging means, and means on the vehicle to move the carriage vertically on the columns and to hold the carriage in the position to which it is moved.

11. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, means on the carriage to swing the sickle in the vertically disposed arc and to hold it in adjusted position about the horizontal axis, means establishing driving connection between the sickle control shaft and the sickle swinging means, and a worm drive on the vehicle to move the carriage vertically on the columns and to hold the carriage in the position to which it is moved.

12. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, a drive pulley carried by the carriage and adapted to be driven by the drive shaft, means establishing driving connection between the pulley and the sickle, means on the carriage to swing the sickle in the vertically disposed arc and to hold it in adjusted position about the horizontal axis, means establishing driving connection between the sickle control shaft and the sickle swinging means, and a worm drive on the vehicle to move the carriage vertically on the columns and to hold the carriage in the position to which it is moved.

13. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, means on the carriage coupled with the vertically disposed drive shaft for actuating the sickle, means on the vehicle to move the carriage vertically on the columns and to hold said carriage in the position to which it is moved, power transmitting means mounted on the vehicle and means between the power transmitting means and the carriage moving means selectively to drive the carriage moving means in a direction to raise or lower the carriage.

14. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, a drive pulley carried by the carriage and adapted to be driven by the drive shaft, means establishing driving connection between the pulley and the sickle, means on the vehicle to move the carriage vertically on the columns and to hold the carriage in the position to which it is moved, power transmitting means on the vehicle, means selectively to establish driving connection between the power transmitting means and the drive shaft, and means between the power transmitting means and the carriage moving means selectively to drive the carriage moving means in a direction to raise or lower the carriage.

15. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, means on the carriage coupled with the vertically disposed drive shaft for actuating the sickle, a worm drive on the vehicle to move the carriage vertically on the columns and to hold the carriage in the position to which it is moved, power transmitting means on the vehicle, means selectively to establish driving connection between the power transmitting means and the drive shaft, and means between the power transmitting means and the worm drive on the vehicle selectively to drive the worm drive in a direction to raise or lower the carriage.

16. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle on the carriage adapted to move vertically therewith, a drive pulley carried by the carriage and adapted to be driven by the drive shaft, means establishing driving connection between the pulley and the sickle, a worm drive on the vehicle to move the carriage vertically on the columns and to hold the carriage in the position to which it is moved, power transmitting means on the vehicle, means selectively to establish driving connection between the power transmitting means and the drive shaft, and means between the power transmitting means and the worm drive on the vehicle selectively to drive the worm drive in a direction to raise or lower the carriage.

17. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, means on the carriage to swing the sickle in the vertically disposed arc and to hold it in adjusted position about the horizontal axis, means establishing driving connection between the sickle control shaft and the sickle swinging means, power transmitting means on the vehicle, means on the vehicle selectively to establish driving connection between the power transmitting means and the drive shaft, and means between the power transmitting means and the control shaft to establish driving connection between the power transmitting means and the control shaft selectively to control the direction of rotation of the control shaft and move the sickle upwardly or downwardly about the horizontal axis.

18. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, means on the carriage to swing the sickle in the vertically disposed arc and to hold it in adjusted position about the horizontal axis, means establishing driving connection between the sickle control shaft and the sickle swinging means, means on the vehicle to move the carriage vertically on the columns and to hold said carriage in the position to which it is moved, power transmitting means on the vehicle, means on the vehicle coupled to the power transmitting means and to the drive shaft selectively to drive the drive shaft, means between the power transmitting means and the carriage moving means selectively to drive the carriage moving means in a direction to raise or lower the carriage.

19. A hedge trimmer and grass cutter comprising a wheeled vehicle, a pair of spaced parallel vertical columns supported on the vehicle, a vertically disposed drive shaft mounted on the vehicle in spaced parallel relation to the columns, a carriage mounted on the columns for vertical adjustment, a sickle mounted on the carriage to swing in a vertical arc about a horizontal axis, means on the carriage coupled with the vertically disposed drive shaft for actuating the sickle, a vertically disposed sickle control shaft mounted on the vehicle in spaced parallel relation to the drive shaft and to the columns, a worm drive on the carriage to swing the sickle in the vertical arc to adjusted position about the horizontal axis, means establishing driving connection between the sickle control shaft and the sickle worm drive on the carriage, a worm drive on the vehicle coupled to the carriage to raise and lower the carriage on the columns, a power transmitting means on the vehicle coupled with the drive shaft selectively to drive said drive shaft, means between the power transmitting means and the sickle control shaft selectively to drive the control shaft in a direction to swing the sickle upwardly or downwardly about the axis and means on the vehicle to couple the power transmitting means to the worm drive on the vehicle selectively to drive the worm drive in a direction to raise or lower the carriage on the columns.

GRAY W. HOLMES.

REFERENCES CITED

The following references are of record in the file of this patent:

UNITED STATES PATENTS

| Number | Name | Date |
| --- | --- | --- |
| 1,679,421 | Himler | Aug. 7, 1928 |
| 1,897,543 | Albrecht | Feb. 14, 1933 |
| 1,911,516 | Landing | May 30, 1933 |
| 1,953,394 | Clapper | Apr. 3, 1934 |
| 2,195,831 | Thompson et al. | Apr. 2, 1940 |
| 2,236,598 | Hautzenroeder | Apr. 1, 1941 |
| 2,324,563 | Custenborder | July 20, 1943 |